United States Patent
Sakamoto (10) Patent No.: US 9,355,322 B2
(45) Date of Patent: May 31, 2016

(54) ROAD ENVIRONMENT RECOGNITION DEVICE

(71) Applicant: HONDA MOTOR CO., LTD., Minato-Ku, Tokyo (JP)

(72) Inventor: Yosuke Sakamoto, Tochigi-Ken (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/420,917

(22) PCT Filed: Apr. 17, 2013

(86) PCT No.: PCT/JP2013/061353
§ 371 (c)(1),
(2) Date: Feb. 11, 2015

(87) PCT Pub. No.: WO2014/027478
PCT Pub. Date: Feb. 20, 2014

(65) Prior Publication Data
US 2015/0206017 A1    Jul. 23, 2015

(30) Foreign Application Priority Data

Aug. 13, 2012  (JP) .................................. 2012-179219

(51) Int. Cl.
| | |
|---|---|
| *G06K 9/00* | (2006.01) |
| *G06T 7/60* | (2006.01) |
| *G08G 1/16* | (2006.01) |
| *B60W 30/12* | (2006.01) |
| *G06K 9/46* | (2006.01) |
| *G06T 7/00* | (2006.01) |

(52) U.S. Cl.
CPC ........... *G06K 9/00798* (2013.01); *B60W 30/12* (2013.01); *G06K 9/4638* (2013.01); *G06T 7/0085* (2013.01); *G06T 7/60* (2013.01); *G08G 1/167* (2013.01); *G06T 2207/10004* (2013.01); *G06T 2207/30256* (2013.01)

(58) Field of Classification Search
CPC ............ G06T 7/60; G06T 2207/30256; G06T 2207/10004; G06T 7/0085; G08G 1/167; G06K 9/00798; G06K 9/4638; B60W 30/12
USPC ........................................................ 382/103
See application file for complete search history.

(56) References Cited

U.S. PATENT DOCUMENTS

2005/0209748 A1    9/2005    Watanabe et al.

FOREIGN PATENT DOCUMENTS

| | | | | |
|---|---|---|---|---|
| JP | 2002312797 A | * | 10/2002 | ................ G06T 7/60 |
| JP | 2005258846 A | * | 9/2005 | ................ G06T 7/60 |
| JP | 4162618 B2 | | 10/2008 | |
| JP | 4631197 B2 | | 2/2011 | |

* cited by examiner

*Primary Examiner* — Gregory F Cunningham
(74) *Attorney, Agent, or Firm* — Carrier Blackman & Associates, P.C.; Joseph P. Carrier; William D. Blackman (57) ABSTRACT

This road environment recognition device is equipped with: a connecting line determination unit, which determines primary connecting lines indicating lane marks by setting candidate points at a position near a vehicle as starting points, and sequentially connecting two or more candidate points along a first direction, which is a direction away from the vehicle; and branch point determination unit, which determines whether a branch point exists on the primary connecting lines on the basis of the positional relationships between the primary connecting lines and a residual candidate point that does not form part of the primary connecting lines.

3 Claims, 11 Drawing Sheets

ROAD ENVIRONMENT RECOGNITION DEVICE

TECHNICAL FIELD

The present invention relates to a road environment recognizing apparatus (road environment recognition device) for recognizing lane marks on a road from an image captured by an image capturing unit that is mounted on a vehicle.

BACKGROUND ART

Heretofore, various apparatus have been proposed for recognizing lane marks that define lanes (traffic lanes) on a road, on the basis of images that are captured of areas in front of and behind a vehicle.

Japanese Patent No. 4631197 discloses an apparatus, which uses a linear equation to approximate a positional dependency of the distance between two white lines, and decides whether or not there is a branch point depending on the gradient of a straight line.

Japanese Patent No. 4162618 discloses an apparatus for formulating the position and direction of each extracted edge line using a real-number parameter composed of at least two variables, and for deciding whether or not a crossing point of two edge lines can be a branch point for a traffic lane, on the basis of whether or not a characteristic differential vector between the two edge lines, which is calculated from the real-number parameter, falls within a prescribed appropriate range.

SUMMARY OF INVENTION

The apparatus disclosed in Japanese Patent No. 4631197 and Japanese Patent No. 4162618 are problematic in that a large amount of computation must be performed, because in order to detect a linear portion, it is necessary to determine linear feature quantities over the entire image.

The present invention has been made in view of the aforementioned problems. An object of the present invention is to provide a road environment recognizing apparatus, which is capable of increasing the accuracy with which a branch lane can be recognized, while at the same time greatly reducing the amount of computation required to perform a process of recognizing lane marks.

According to the present invention, a road environment recognizing apparatus is provided, comprising an image capturing unit that is mounted on a vehicle and captures an image including a road on which the vehicle is driven, a candidate point extractor that extracts a plurality of candidate points indicating respective candidate positions of intermittent lane marks from within the image that is captured by the image capturing unit, a connecting line determiner that determines a primary connecting line represented by the lane marks, by successively connecting two or more candidate points along a first direction away from the vehicle, from a candidate point that serves as a starting point at a position close to the vehicle, and a branch point discriminator that decides whether or not a branch point exists on the primary connecting line, on basis of a first positional relationship between the primary connecting line determined by the connecting line determiner and remaining candidate points that do not make up the primary connecting line. In the road environment recognizing apparatus, if the branch point discriminator decides that a branch point exists, the connecting line determiner further determines a secondary connecting line, which is indicated by one of the lane marks, by successively connecting two or more candidate points from among the remaining candidate points, along a second direction that intersects with the first direction, from the branch point that serves as a starting point.

Since the connecting line determiner is provided for determining the primary and secondary connecting lines indicated by the lane marks, by successively connecting two or more candidate points along the first and second directions, the amount of computation required for the process of recognizing lane marks can be reduced significantly. Furthermore, inasmuch as the branch point discriminator is provided for deciding whether or not the branch point exists on the primary connecting line, on the basis of the positional relationship between the primary connecting line and the remaining candidate points that do not make up the primary connecting line, the decision as to whether or not the branch point, i.e., the secondary connecting line, exists from the positional relationship with the primary connecting line can be made with increased accuracy. Accordingly, a branch lane can be recognized with increased accuracy, while at the same time the amount of computation required to perform the process of recognizing lane marks is significantly reduced.

The branch point discriminator preferably decides whether or not a branch point candidate on the primary connecting line is the branch point, on basis of an angle formed between a tangential direction to the primary connecting line at the branch point candidate and an adjoining direction between the branch point candidate and a candidate point that is closest to the branch point candidate from among the remaining candidate points. Consequently, the feature of the branch point is recognized accurately from the standpoint of the angle of intersection between the connecting lines, and thus, whether or not the branch point exists can be decided with increased accuracy.

Moreover, the branch point discriminator preferably decides whether or not the branch point candidate is the branch point, on basis of a distance between the branch candidate and the candidate point that is closest to the branch point candidate from among the remaining candidate points. Consequently, the feature of the branch point is recognized accurately from the standpoint of the distance between each of the candidate points. Therefore, the decision as to whether or not the branch point exists can be made with increased accuracy.

Since the road environment recognizing apparatus according to the present invention includes the connecting line determiner for determining the primary and secondary connecting lines indicated by the lane marks, by successively connecting two or more candidate points along the first and second directions, the amount of computation required for the process of recognizing lane marks can be reduced significantly. Furthermore, inasmuch as the road environment recognizing apparatus further includes the branch point discriminator for deciding whether or not the branch point exists on the primary connecting line, on the basis of the positional relationship between the primary connecting line and the remaining candidate points that do not make up the primary connecting line, the decision as to whether or not the branch point, i.e., the secondary connecting line, exists from the positional relationship with the primary connecting line can be made with increased accuracy. Accordingly, a branch lane can be recognized with increased accuracy, while at the same time the amount of computation required to perform the process of recognizing lane marks is significantly reduced.

DESCRIPTION OF EMBODIMENTS

A road environment recognizing apparatus according to a preferred embodiment of the present invention will be described below with reference to the accompanying drawings.

[Configuration of Drive Assisting Apparatus 10]

Figure 1:
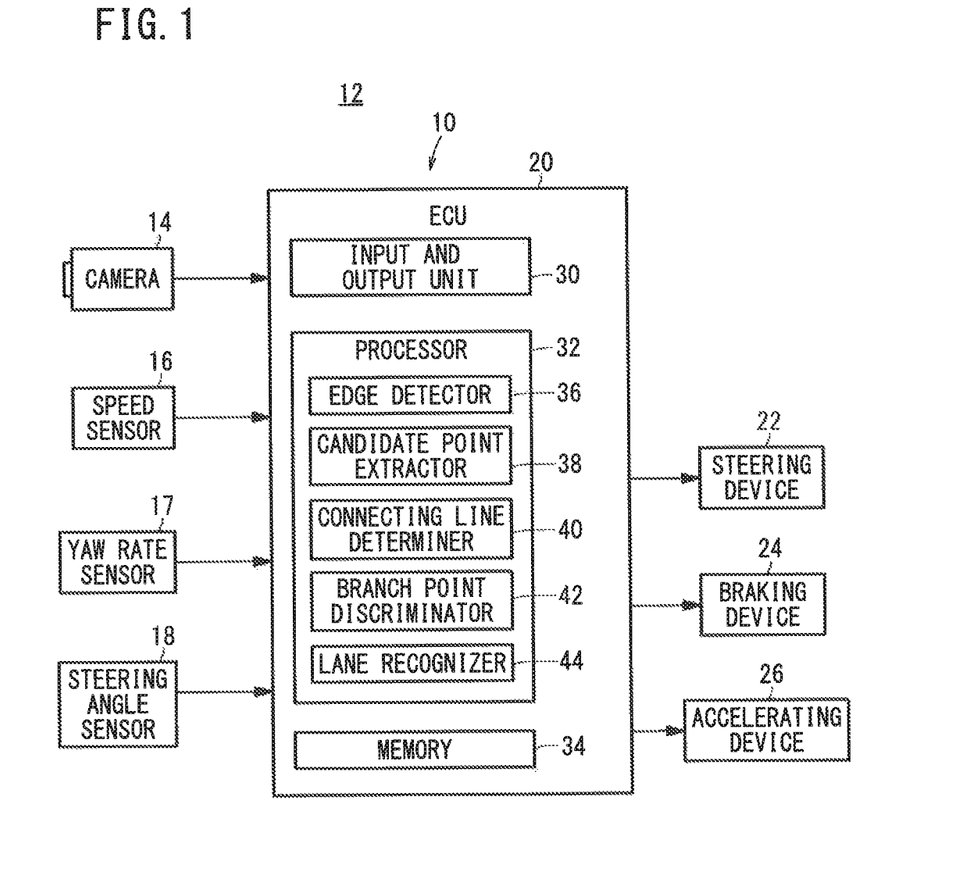
FIG. 1 is an electric block diagram of the configuration of a driving assisting apparatus, which serves as a road environment recognizing apparatus according to an embodiment of the present invention.
Figure 2:
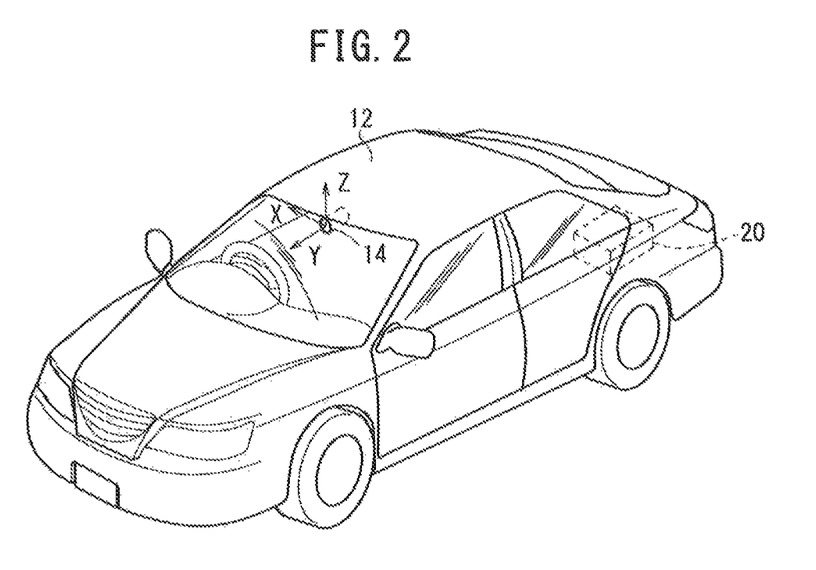
FIG. 2 is a schematic perspective view of a vehicle in which the driving assisting apparatus shown in FIG. 1 is incorporated.

FIG. 1 is an electric block diagram of the configuration of a drive assisting apparatus 10, which serves as a road environment recognizing apparatus according to an embodiment of the present invention. FIG. 2 is a schematic perspective view of a vehicle 12 in which the drive assisting apparatus 10 shown in FIG. 1 is incorporated.

The drive assisting apparatus 10 according to the present embodiment performs a function to assist the vehicle 12 in staying in a lane (traffic lane) without deviating from the lane. Each lane on a road is defined by continuous or intermittent linear lane marks on the road. The lane marks may comprise continuous lines such as white lines or the like, or intermittent lines such as a plurality of linear-segment patterns, Botts' dots, cat's eyes, or the like, which are disposed at substantially equal intervals.

As shown in FIG. 1, the drive assisting apparatus 10 includes a camera (image capturing unit) 14 for capturing images of the periphery of the vehicle 12, a speed sensor 16 for detecting a speed of the vehicle 12, a yaw rate sensor 17 for detecting a yaw rate of the vehicle 12, a steering angle sensor 18 for detecting a steering angle of a steering wheel of the vehicle 12, an electronic control unit (ECU) 20 for recognizing lane marks from an image captured by the camera 14, a steering device 22, a braking device 24, and an accelerating device 26.

As shown in FIG. 2, the camera 14 is mounted on an upper portion of a front windshield of the vehicle 12, and captures an image (captured image 60 in FIG. 4A), including a road on which the vehicle 12 is driven, through the front windshield. More specifically, the camera 14 comprises a digital camera, which is capable of capturing images at prescribed frame clock intervals, e.g., 30 frames per second. An actual-space coordinate system is defined for the camera 14, the origin of which is located at a position where the camera 14 is mounted. The X-axis of the actual-space coordinate system extends along a widthwise direction (horizontal direction) of the vehicle 12, the Y-axis thereof extends along a vehicle-axis direction (a direction along which the vehicle 12 is driven), and the Z-axis thereof extends along a heightwise direction (vertical direction) of the vehicle 12.

The ECU 20 comprises a computer such as a microcomputer or the like. According to the present embodiment, the ECU 20 functions as an input and output unit 30, a processor 32, and a memory 34.

Signals from the camera 14, the speed sensor 16, the yaw rate sensor 17, and the steering angle sensor 18 are input to the ECU 20 through the input and output unit 30. Signals from the ECU 20 are output through the input and output unit 30 to the steering device 22, the braking device 24, and the accelerating device 26. The input and output unit 30 is provided with a non-illustrated A/D converting circuit for converting analog signals input thereto into digital signals.

The processor 32 carries out processing operations based on the signals from the camera 14, the speed sensor 16, the yaw rate sensor 17, and the steering angle sensor 18. On the basis of the results of such processing operations, the processor 32 generates signals for the steering device 22, the braking device 24, and the accelerating device 26. The processor 32 functions as an edge detector 36, a candidate point extractor 38, a connecting line determiner 40, a branch point discriminator 42, and a lane recognizer 44.

The functions of the components of the processor 32 are realized by reading and executing programs stored in the memory 34. Alternatively, the programs may be supplied from an external source through a non-illustrated wireless communications device (a mobile phone, a smartphone, or the like).

The memory 34 comprises a random access memory (RAM) for storing captured image signals that have been converted into digital signals, temporary data used in various processing operations, etc., and a read only memory (ROM) for storing programs to be executed, tables or maps, etc.

[Operations of Drive Assisting Apparatus 10]

The drive assisting apparatus 10 according to the present embodiment is configured basically as described above. Operations of the drive assisting apparatus 10, and in particular, a process of recognizing lane marks, will be described in detail below with reference to the flowchart shown in FIG. 3.

Figure 3:
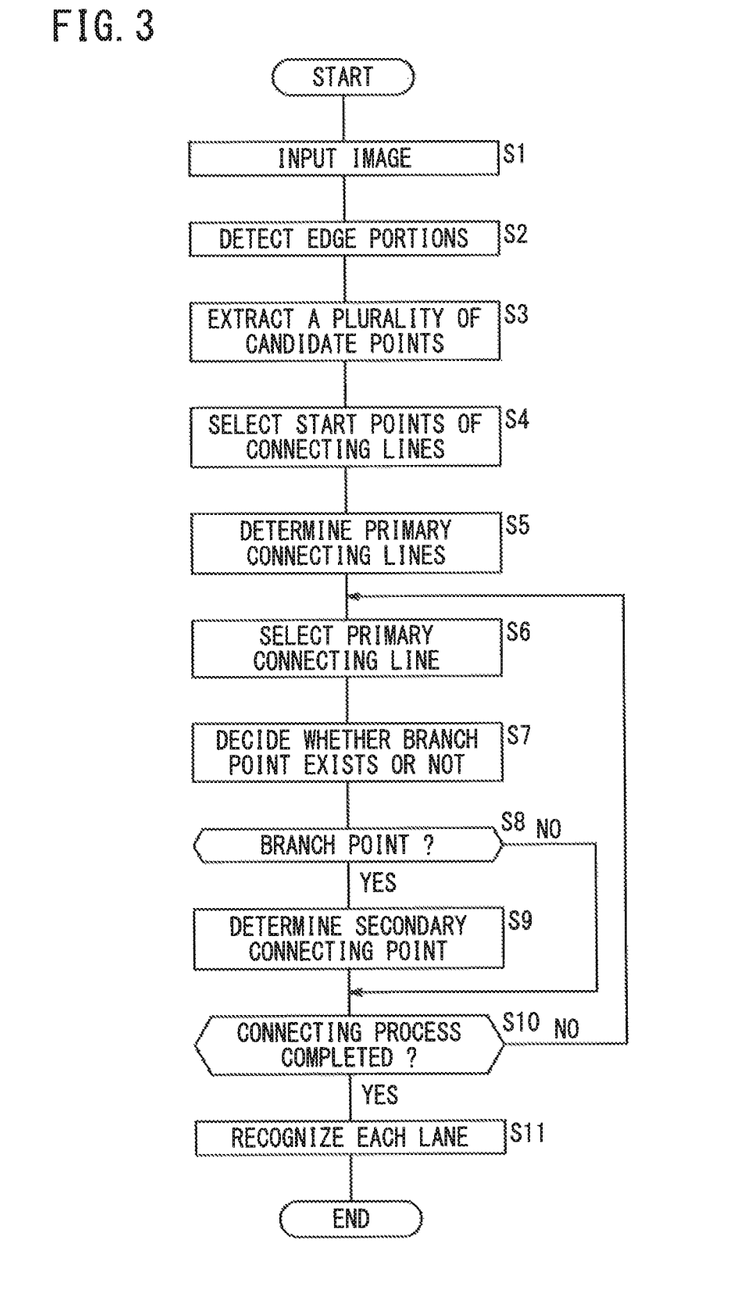
FIG. 3 is a flowchart of an operation sequence of the driving assisting apparatus shown in FIG. 1.

In step S1, the ECU 20 acquires, frame by frame, a captured image 60 (see FIG. 4A), which is represented by an output signal of the camera 14 covering an area (a predetermined angle of view) in front of the vehicle 12. The ECU 20 then temporarily stores the acquired captured image 60 in the memory 34. If an RGB camera, for example, is used as the camera 14, the acquired captured image 60 is a multigradation image having three color channels.

Figure 4A:
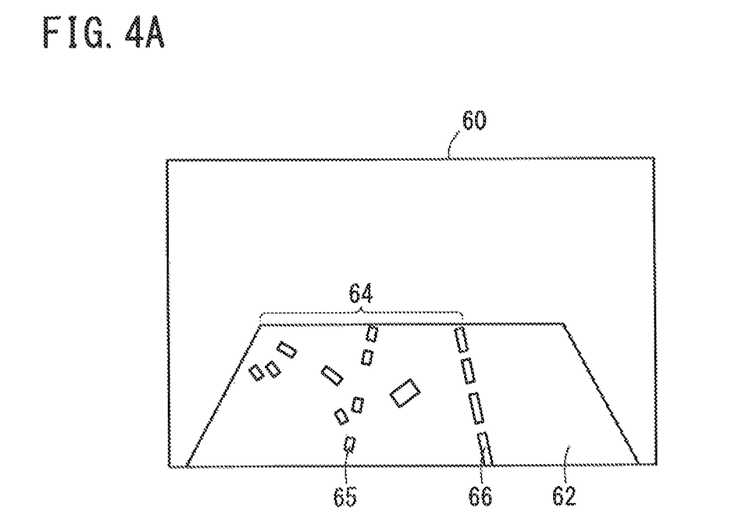
FIG. 4A is a view showing, by way of example, a captured image acquired by a camera.
Figure 4B:
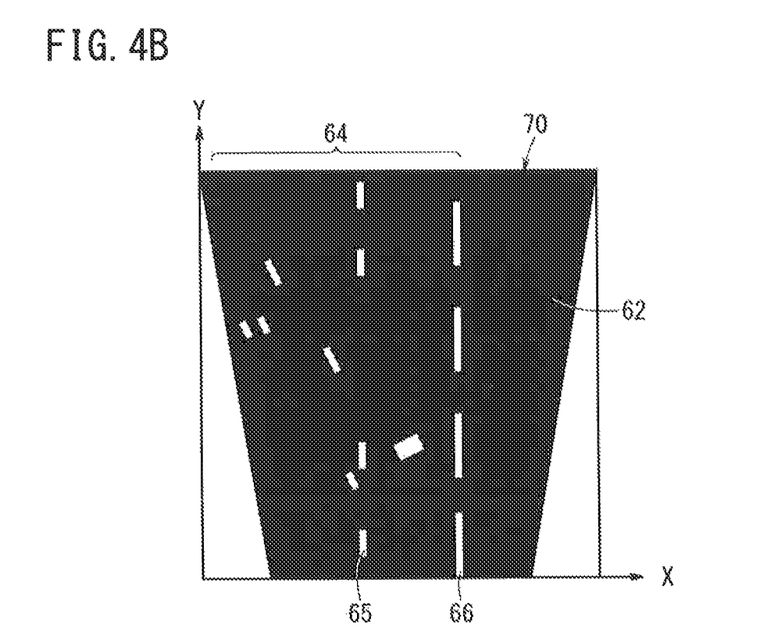
FIG. 4B is an overhead view of the captured image shown in FIG. 4A.

FIG. 4A shows by way of example the captured image 60 acquired in an image capturing process using the camera 14. FIG. 4B is an overhead view of the captured image 60 shown in FIG. 4A.

As shown in FIG. 4A, a projected image of the road (hereinafter simply referred to as a "road 62") on which the vehicle 12 is driven is visible in the captured image 60. The captured image 60 includes a group of marks indicating a road environment (hereinafter referred to as a "road marking 64") on the road 62. Elements that make up the road marking 64 will hereinafter be referred to as "marking elements". In the example shown in FIG. 4A, two marking elements, which are closest to the vehicle 12, are denoted by reference characters 65 and 66. An overhead image 70, as shown in FIG. 4B, is an image representing a spatial area in the angle of view of the camera 14 as viewed from above (along the Z-axis shown in FIG. 2).

For facilitating understanding of the present invention, a processing sequence of recognizing lane marks will be described below using the overhead image 70. Generally, other objects exist on the road 62 or in other locations. However, for the sake of clarity, such other objects are omitted from illustration.

Figure 5A:
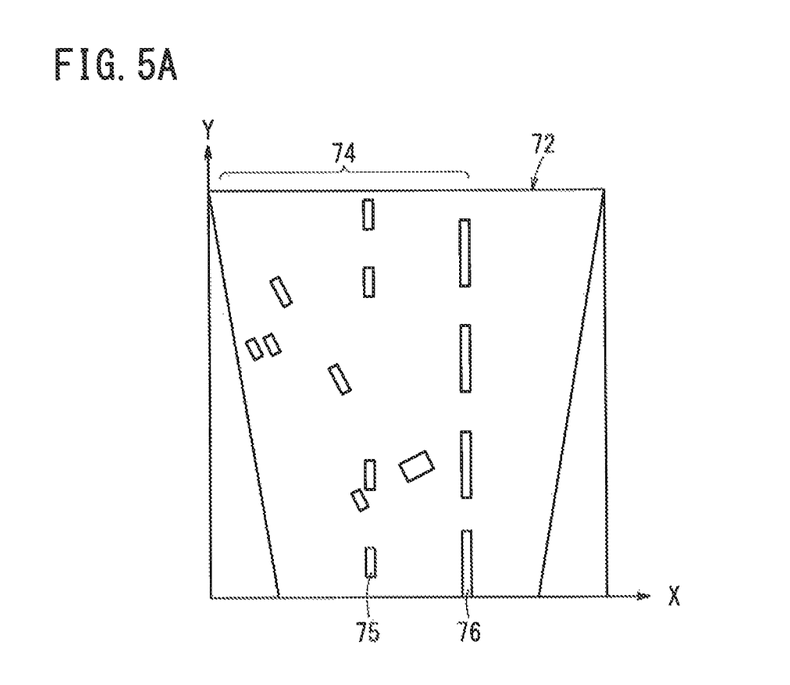
FIG. 5A is an overhead view of an edge detection image, which is produced from the captured image shown in FIG. 4A.

In step S2, the edge detector 36 performs a known edge detecting process on the captured image 60 that was acquired in step S1, thereby producing an edge detection image 72. As shown in FIG. 5A, the edge detection image 72 contains an edge group 74 that corresponds in shape to the road marking 64. Edge portions 75, which are rectangular in shape and shorter, correspond to the marking element 65, whereas edge portions 76, which are rectangular in shape and longer, correspond to the marking element 66.

Figure 5B:
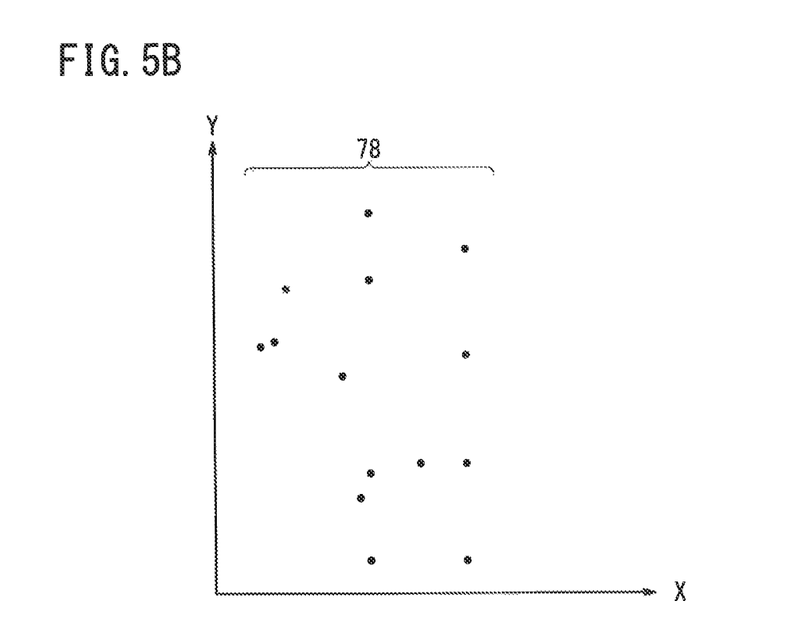
FIG. 5B is a diagram showing candidate positions for lane marks.

In step S3, on the basis of the edge detection image 72 produced in step S2, the candidate point extractor 38 extracts a plurality of candidate points 78 indicative of respective candidate positions of the lane marks. More specifically, the candidate point extractor 38 extracts representative points (specifically, center-of-gravity positions, end points, etc.) of regions represented by the edge portions 75, 76 as respective candidate points 78. As a result, as shown in FIG. 5B, as many candidate points 78 as the number of edge portions that make up the edge group 74, i.e., fourteen candidate points 78, are extracted.

In step S4, from among the candidate points 78 that were extracted in step S3, the connecting line determiner 40 selects the candidate points 78 that exist closer to the vehicle 12, i.e., which are positioned in a lower section of the captured image 60, as starting points of primary connecting lines, to be described later.

In step S5, the connecting line determiner 40 determines primary connecting lines 85, 90 (see FIG. 6) that extend along the direction of the arrow D1 (first direction) from the starting points selected in step S4. Each of the primary connecting lines 85, 90 is a line drawn by successively connecting two or more candidate points 78, i.e., a line indicated by lane marks. The candidate points 78, which are finalized in this manner as points making up the primary connecting lines 85, 90, will hereinafter be referred to as "primary finalized points".

Figure 6:
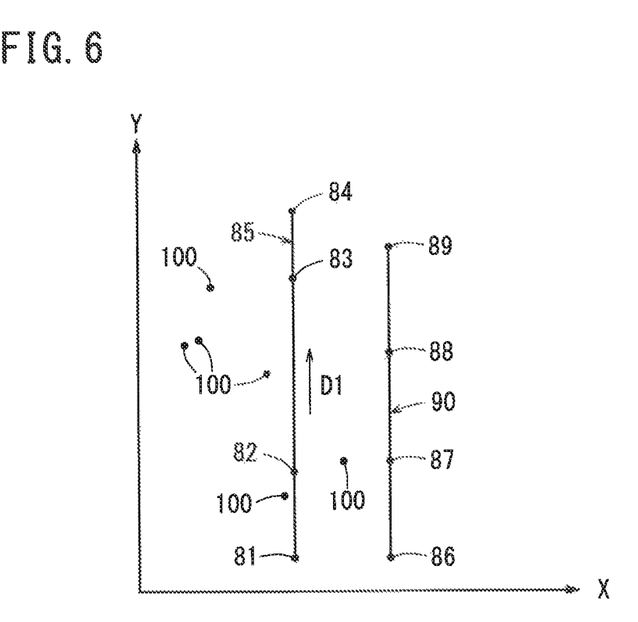
FIG. 6 is a diagram that relates to a process of determining primary connecting lines.

The primary connecting lines 85, 90 may be determined by a process of referring to the shapes and orientations of the edge portions 75, etc., and connecting candidate points 78 that are oriented in the same direction, or alternatively, by a process of successively selecting candidate points 78 that are spaced from one another by shortest distances. Furthermore, the signal from the speed sensor 16, the yaw rate sensor 17, or the steering angle sensor 18 may also be referred to.

As shown in FIG. 6, the primary connecting line 85 is determined by successively connecting primary finalized points 82, 83, 84 from a primary finalized point 81 as a starting point. Similarly, the primary connecting line 90 is determined by successively connecting primary finalized points 87, 88, 89 from a primary finalized point 86 as a starting point. In FIG. 6, as well as in FIGS. 7A through 8B to be described later, remaining candidate points, which do not make up the primary connecting lines 85, 90 from among the candidate points 78, will be referred to as "remaining candidate points 100".

In step S6, the branch point discriminator 42 selects one of the primary connecting lines 85, 90 that was determined in step S5. Initially, it will be assumed that the primary connecting line 85 is selected.

In step S7, the branch point discriminator 42 decides whether or not a branch point exists on the primary connecting line 85 that was selected in step S6. More specifically, assuming that a branch point exists on the primary connecting line 85, the branch point discriminator 42 decides sequentially whether or not the branch point and the remaining candidate points 100 that do not make up the primary connecting line 85 satisfy a first positional relationship. The first positional relationship is a condition in which the distance up to the branch point does not exceed an upper limit value rth.

A discriminating process, which is carried out by the branch point discriminator 42, will be described below with reference to FIGS. 7A through 8B. The discriminating process is premised on the fact that a branch point coincides with any one of the primary finalized points 81 through 84 that make up the primary connecting line 85.

Figure 7A:
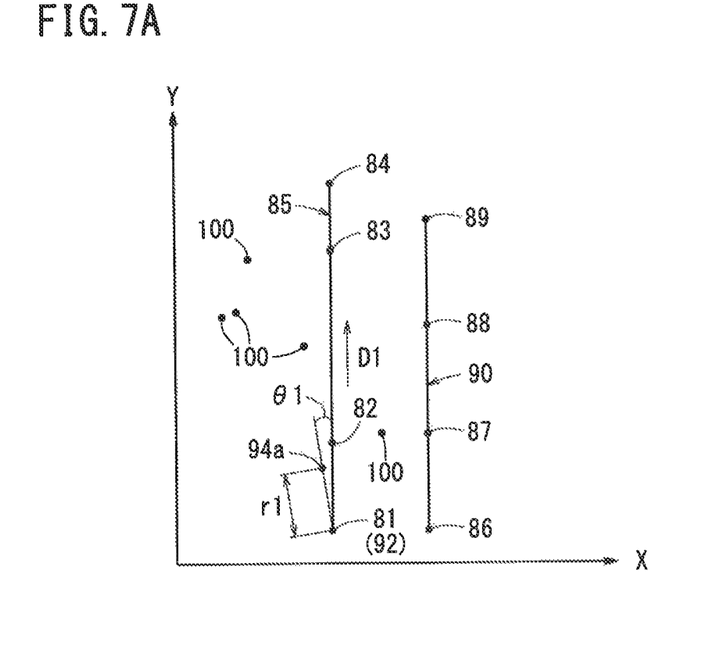
FIGS. 7A and 7B are diagrams that relate to a process of distinguishing a branch point.

Assuming that the primary finalized point 81 is a branch point candidate 92, then as shown in FIG. 7A, a proximity point 94a satisfies the first positional relationship, because the proximity point 94a exists at a position where the distance r1 from the branch point candidate 92 does not exceed the upper limit value rth.

Thereafter, the branch point discriminator 42 decides whether or not the branch point candidate 92 and the proximity point 94a satisfy a second positional relationship. The second positional relationship is a condition in which an angle of intersection θ1 satisfies the range θmin (arbitrary lower limit value)≤θ1≤θmax (arbitrary upper limit value). The angle of intersection θ1 refers to an angle formed between a tangential direction (the direction of the arrow D1) to the primary connecting line 85 at the branch point candidate 92 and an adjoining direction between the branch point candidate 92 and the proximity point 94a.

Stated otherwise, the branch point discriminator 42 decides that the primary finalized point 81 is a branch point if the angle of intersection θ1 falls within the range θmin≤θ1≤θmax. Otherwise, the branch point discriminator 42 decides that the primary finalized point 81 is not a branch point. In the example shown in FIG. 7A, since θ1<θmin, the second positional relationship is not satisfied. Therefore, the branch point discriminator 42 decides that the primary finalized point 81 is not a branch point in relation to the proximity point 94a.

Figure 7B:
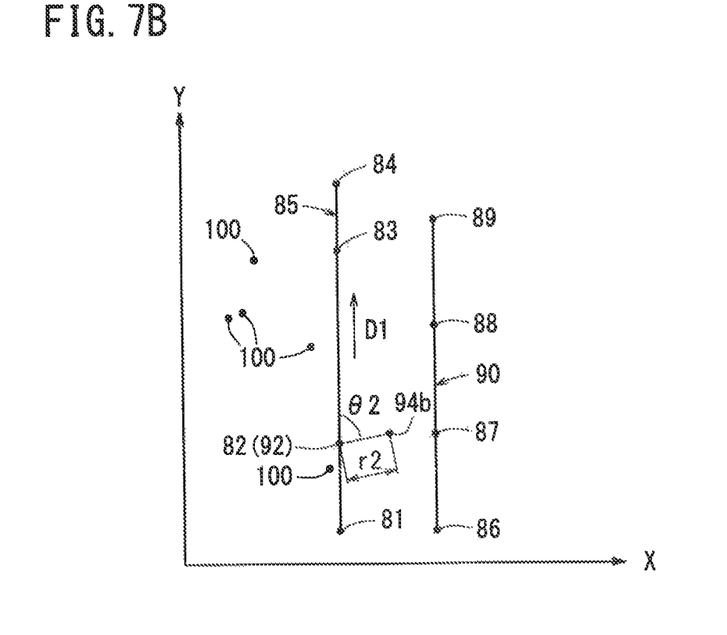

Assuming that the primary finalized point 82 is a branch point candidate 92, then as shown in FIG. 7B, a proximity point 94b satisfies the first positional relationship, because the proximity point 94b exists at a position where the distance r2 from the branch point candidate 92 does not exceed the upper limit value rth. An angle of intersection θ2 is defined by an angle formed between a tangential direction (the direction of the arrow D1) to the primary connecting line 85 at the branch point candidate 92 and an adjoining direction between the branch point candidate 92 and the proximity point 94b. In the example shown in FIG. 7B, since θ2>θmax, the second positional relationship is not satisfied. Therefore, the branch point discriminator 42 decides that the primary finalized point 82 is not a branch point in relation to the proximity point 94b.

Figure 8A:
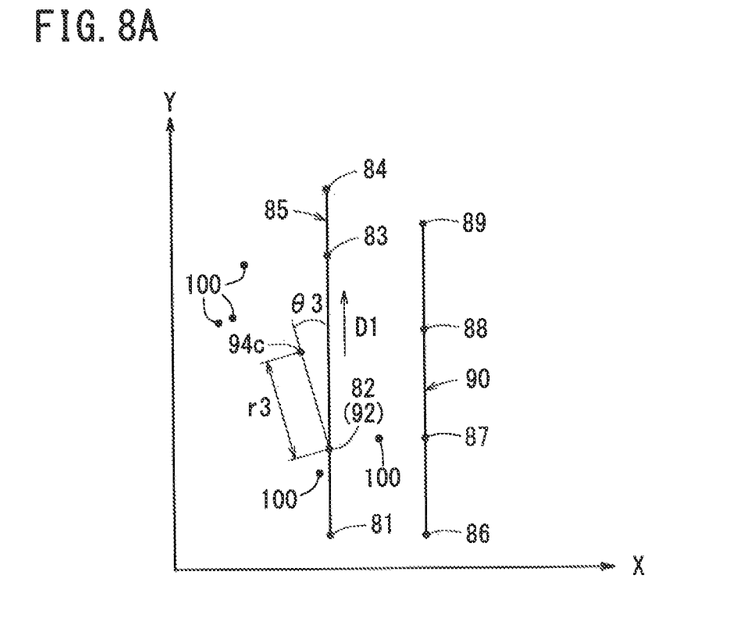
FIGS. 8A and 8B are diagrams that relate to a process of determining a secondary connecting line.

Assuming that the primary finalized point 82 is a branch point candidate 92, then as shown in FIG. 8A, a proximity point 94c satisfies the first positional relationship, because the proximity point 94c exists at a position where the distance r3 from the branch point candidate 92 does not exceed the upper limit value rth. An angle of intersection θ3 is defined by an angle that is formed between a tangential direction (the direction of the arrow D1) to the primary connecting line 85 at the branch point candidate 92 and an adjoining direction between the branch point candidate 92 and the proximity point 94c. In the example shown in FIG. 8A, the second positional relationship is satisfied because θmin≤θ3≤θmax. Therefore, the branch point discriminator 42 decides that the primary finalized point 82 is a branch point in relation to the proximity point 94c.

Thereafter, the same process described above is carried out on the remaining primary finalized points 83, 84. As a result, the branch point discriminator 42 decides that one branch point 96 (i.e., the primary finalized point 82) exists on the primary connecting line 85.

In step S8, the connecting line determiner 40 performs an additional process depending on the decision made in step S7. If it is decided that a branch point 96 exists (step S8: YES), then in step S9, the connecting line determiner 40 determines a secondary connecting line 99, which extends along the direction of the arrow D2 (second direction) from the branch point 96 as a starting point. The secondary connecting line 99 is a line, i.e., a line indicated by lane marks, drawn by successively connecting the branch point 96 on the primary connecting line 85 and two or more of the remaining candidate points 100. The candidate points 78 (except for the branch point 96), which are finalized as points making up the secondary connecting line 99, will hereinafter be referred to as "secondary finalized points". The secondary connecting line 99 may be determined by a process that is the same as the process used for determining the primary connecting lines 85, 90, or by a different process.

Figure 8B:
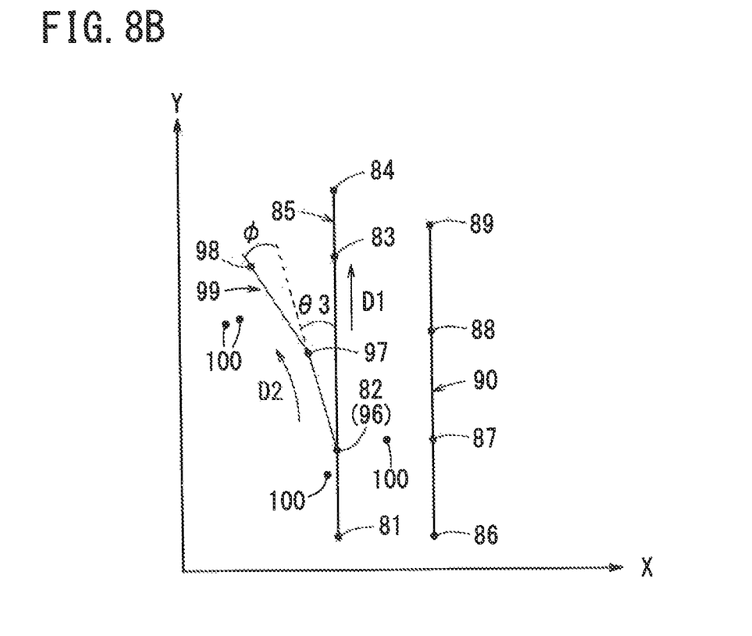

As shown in FIG. 8B, the secondary connecting line 99 is determined by successively connecting secondary finalized points 97, 98 from the branch point 96 (the primary finalized point 82) that serves as a starting point. The number of secondary connecting lines 99 that are determined in step S9 agrees with the number of branch points 96. In other words, if plural branch points exist, the connecting line determiner 40 determines secondary connecting lines that extend from the respective branch points as starting points.

Returning to step S8, if it is decided that a branch point 96 does not exist (step S8: NO), the control skips over step S9 and proceeds to the next step S10.

In step S10, the connecting line determiner 40 decides whether or not the connecting process is completed. More specifically, if all of the primary connecting lines 85, 90 have been selected in step S6, the connecting line determiner 40 decides that the connecting process is completed. At this time, since the primary connecting line 90 is not yet selected, the connecting line determiner 40 decides that the connecting process is not completed (step S10: NO). Control then returns to step S6, and steps S6 through S10 are repeated in succession.

If the primary connecting line 90 is selected in step S6, then in step S7, as can be seen from FIG. 6, the branch point discriminator 42 decides that a branch point does not exist on the primary connecting line 90. Thereafter, having performed step S8, the connecting line determiner 40 decides that the connecting process is completed (step S10: YES), since all of the primary connecting lines 85, 90 have been selected.

In step S11, the lane recognizer 44 recognizes lanes from the captured image 60 (see FIG. 4A) that was acquired in step S1. More specifically, the lane recognizer 44 recognizes as lane marks the primary connecting lines 85, 90 that were determined in step S5, and the secondary connecting line 99 that was determined in step S9.

Figure 9:
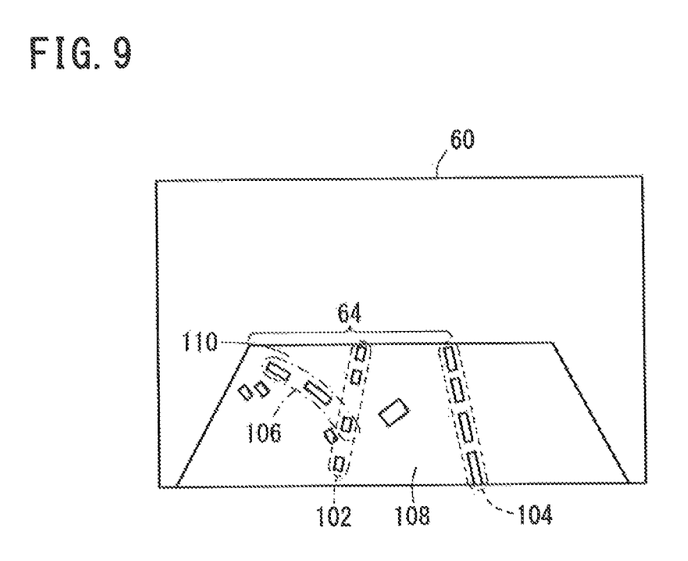
FIG. 9 is a view showing recognized lane marks in the captured image shown in FIG. 4A.

As shown in FIG. 9, the lane recognizer 44 recognizes an area between a lane mark 102 corresponding to the primary connecting line 85 and a lane mark 104 corresponding to the primary connecting line 90 as a straight forward lane 108. The lane recognizer 44 also recognizes an area between the lane mark 102 corresponding to the primary connecting line 85 and a lane mark 106 corresponding to the secondary connecting line 99 as a branch lane 110.

In this manner, using the captured image 60, which is produced by the camera 14 that is mounted on the vehicle 12, the drive assisting apparatus 10 recognizes the respective lane marks 102, 104, 106 on the road 62.

Based on the lane marks 102, etc., which have been recognized by the ECU 20, the drive assisting apparatus 10 controls the steering device 22, the braking device 24, and the accelerating device 26 (see FIG. 1) under prescribed conditions, thereby assisting the driver in driving the vehicle 12 along the center of the lane.

As described above, the drive assisting apparatus 10, which serves as the road environment recognizing apparatus according to the present embodiment, is provided with the connecting line determiner 40 for determining the primary connecting lines 85, 90 indicated by the lane marks 102, 104, by successively connecting two or more candidate points 78 (primary finalized points 81 through 84 and 86 through 89) along the direction of the arrow D1, which is a direction away from the vehicle 12, from the candidate points 78 (primary finalized points 81, 86) at positions close to the vehicle 12, which serve as starting points. The drive assisting apparatus is further provided with the branch point discriminator 42 for deciding whether or not the branch point 96 exists on the primary connecting lines 85, 90, on the basis of the positional relationship between the primary connecting lines 85, 90 and the remaining candidate points 100 that do not make up the primary connecting lines 85, 90.

Since the connecting line determiner 40 is provided for determining the primary connecting lines 85, 90 and the secondary connecting line 99 indicated by the lane marks 102, 104, 106, by successively connecting two or more candidate points 78 along the direction of the arrow D1 and the direction of the arrow D2, the amount of computation required for the process of recognizing the lane marks 102, etc., can be reduced significantly. Furthermore, inasmuch as the branch point discriminator 42 is provided for deciding whether or not the branch point 96 exists on the primary connecting lines 85, 90, on the basis of the positional relationship between the primary connecting lines 85, 90 and the remaining candidate points 100 that do not make up the primary connecting lines 85, 90, the decision as to whether or not the branch point 96, i.e., the secondary connecting line 99, exists from the positional relationship with the primary connecting lines 85, 90 can be made with increased accuracy. Accordingly, the branch lane 110 can be recognized with increased accuracy, while at the same time, the amount of computation required to perform the process of recognizing the lane marks 102, etc., can be significantly reduced.

The branch point discriminator 42 decides whether or not the branch point candidate 92 is the branch point 96, on the basis of the angle formed between the tangential direction to the primary connecting lines 85, 90 at the branch point candidate 92 and the adjoining direction between the branch point candidate 92 and one of the proximity points 94a through 94c from among the remaining candidate points 100 that is closest to the branch point candidate 92. Consequently, the feature of the branch point 96 is recognized accurately from the standpoint of the angle of intersection between the connecting lines, and thus, whether or not the branch point 96 exists can be decided with increased accuracy.

Furthermore, the branch point discriminator 42 decides whether or not the branch point candidate 92 is the branch point 96, on the basis of the distance between the branch point candidate 92 and one of the proximity points 94a through 94c. Consequently, the feature of the branch point 96 is accurately grasped from the standpoint of the distance of each of the candidate points 78. Thus, the decision as to whether or not the branch point 96 exists can be made with increased accuracy.

[Other Modes of Operation]

Another process of recognizing lane marks will be described below.

Figure 10:
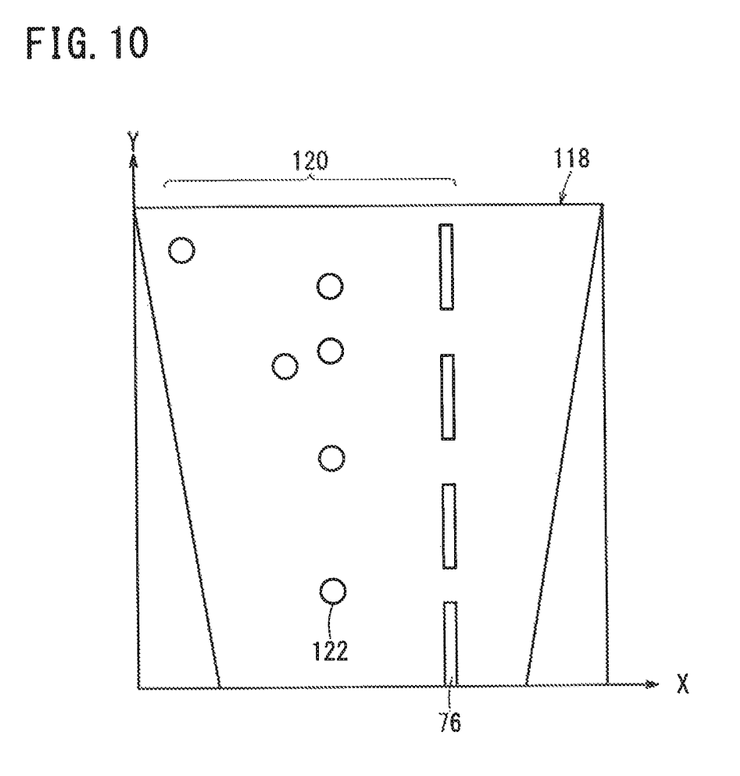
FIG. 10 is an overhead view of an edge detection image that differs from that shown in FIG. 5A.

FIG. 10 is an overhead view of an edge detection image 118 that differs from that shown in FIG. 5A. An edge group 120 in the edge detection image 118 is composed of annular edge portions 122 instead of the short edge portions 75 (see FIG. 5A). Each of the annular edge portions 122 represents the shape of a Botts' dot.

When a plurality of candidate points are extracted on the basis of the edge detection image 118, in the same manner as in step S3, the accuracy with which a branch point is recognized may be lowered. This is because the directions pointed to by the edge portions 122 cannot be identified from the shape of the edge portions 122, thereby making it difficult to determine which marks lie adjacent to each other, or stated otherwise, which lanes are indicated.

Figure 11:
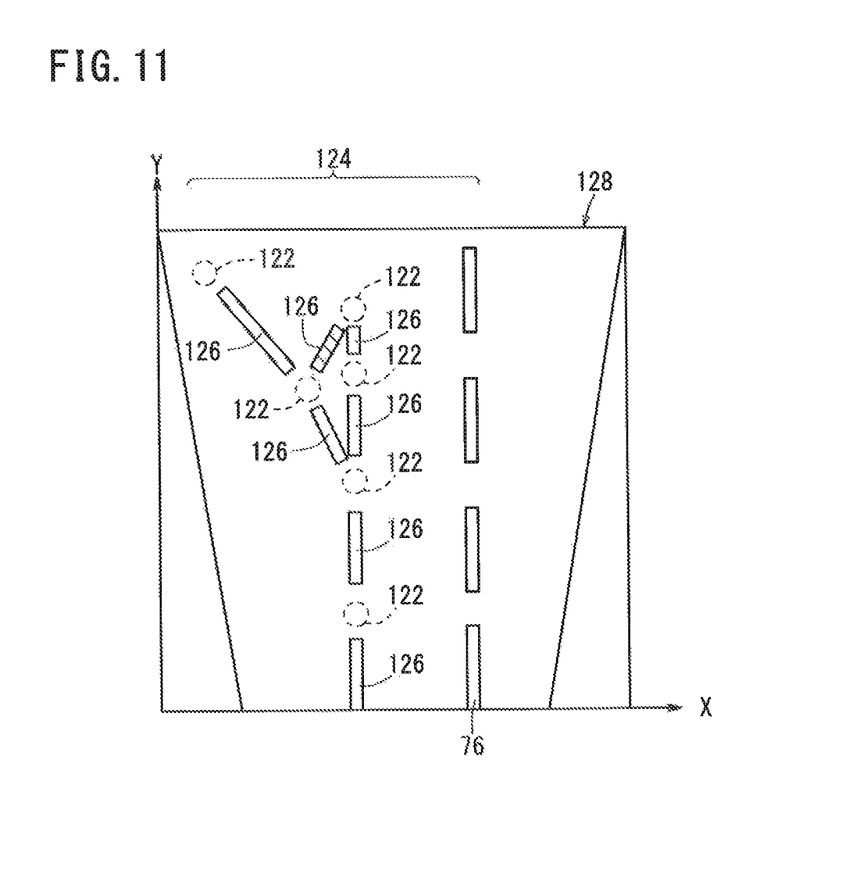
FIG. 11 is a view showing the result of a conversion process, which is performed on the edge detection image shown in FIG. 10.

In view of the foregoing, as shown in FIG. 11, the edge detector 36 converts the edge group 120, which includes the annular edge portions 122, into an edge group 124 that does not include the annular edge portions 122. Instead of the annular edge portions 122, the edge group 124 is composed of rectangular edge portions 126. Each edge portion 126 is disposed on a line segment that interconnects adjacent edge portions 122.

The process of recognizing lane marks is carried out in the same manner as with the above process, by extracting a plurality of candidate points based on an edge detection image 128 that has been produced in the foregoing manner. An edge portion 126, which is shown by hatching, is not selected, but rather is excluded in determining the connecting lines in steps S6 and S9 (see FIG. 3).

The present invention is not limited to the embodiment described above. Various changes and modifications can freely be made to the embodiment without departing from the scope of the invention as set forth in the appended claims.

According to the present embodiment, a decision is made as to whether or not a branch point 96 exists after the shape of the primary connecting lines 85, 90 has been finalized. However, the deciding process is not limited to such a sequence. For example, immediately after the connecting line determiner 40 has determined a primary finalized point 83, the branch point discriminator 42 may decide whether or not the primary finalized point 82 is a branch point 96.

The invention claimed is:

1. A road environment recognizing apparatus comprising:
an image capturing unit that is mounted on a vehicle and captures an image including a road on which the vehicle is driven;
a candidate point extractor that extracts a plurality of candidate points indicating respective candidate positions of intermittent lane marks from within the image that is captured by the image capturing unit;
a connecting line determiner that determines a primary connecting line represented by the lane marks, by successively connecting two or more candidate points along a first direction away from the vehicle, from a candidate point that serves as a starting point at a position close to the vehicle; and
a branch point discriminator that decides whether or not a branch point exists on the primary connecting line, on basis of a first positional relationship between the primary connecting line determined by the connecting line determiner and remaining candidate points that do not make up the primary connecting line,
wherein if the branch point discriminator decides that a branch point exists, the connecting line determiner further determines a secondary connecting line, which is indicated by one of the lane marks, by successively connecting two or more candidate points from among the remaining candidate points, along a second direction that intersects with the first direction, from the branch point that serves as a starting point.

2. The road environment recognizing apparatus according to claim 1, wherein the branch point discriminator decides whether or not a branch point candidate on the primary connecting line is the branch point, on basis of an angle formed between a tangential direction to the primary connecting line at the branch point candidate and an adjoining direction between the branch point candidate and a candidate point that is closest to the branch point candidate from among the remaining candidate points.

3. The road environment recognizing apparatus according to claim 2, wherein the branch point discriminator decides whether or not the branch point candidate is the branch point, on basis of a distance between the branch point candidate and the candidate point that is closest to the branch point candidate from among the remaining candidate points.

* * * * *